(12) United States Patent
Enskonatus (10) Patent No.: US 10,626,853 B2
(45) Date of Patent: Apr. 21, 2020

(54) WIND TURBINE HAVING A LIQUID CIRCUIT AND COMPONENTS THEREFORE

(71) Applicant: Wobben Properties GmbH, Aurich (DE)

(72) Inventor: Kai Enskonatus, Hinte (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/564,420

(22) PCT Filed: Apr. 8, 2016

(86) PCT No.: PCT/EP2016/057698
§ 371 (c)(1),
(2) Date: Oct. 4, 2017

(87) PCT Pub. No.: WO2016/162457
PCT Pub. Date: Oct. 13, 2016

(65) Prior Publication Data
US 2018/0258918 A1    Sep. 13, 2018

(30) Foreign Application Priority Data

Apr. 10, 2015   (DE) .......................... 10 2015 206 478

(51) Int. Cl.
*F03D 80/60*   (2016.01)
*F16K 17/19*   (2006.01)
*G01F 23/02*   (2006.01)

(52) U.S. Cl.
CPC .............. *F03D 80/60* (2016.05); *F16K 17/19* (2013.01); *G01F 23/02* (2013.01); *F05B 2240/14* (2013.01); *F05B 2260/205* (2013.01); *Y02E 10/726* (2013.01); *Y02T 50/675* (2013.01)

(58) Field of Classification Search
CPC .......... F03D 80/60; F03D 80/80; F03D 80/82; F03D 80/88; F05B 2260/205
USPC .............................. 415/175; 290/55; 165/47
See application file for complete search history.

(56) References Cited

U.S. PATENT DOCUMENTS

| | | | |
|---|---|---|---|
| 7,884,691 B2 * | 2/2011 | Findeisen | H01F 27/12 336/57 |
| 8,541,902 B2 * | 9/2013 | Casazza | H02K 7/1838 290/55 |
| 9,377,008 B2 * | 6/2016 | Hildebrand | H02K 7/1838 |
| 2008/0164966 A1 * | 7/2008 | Findeisen | H01F 27/12 336/57 |

(Continued)

FOREIGN PATENT DOCUMENTS

| DE | 102008017376 A1 | 10/2009 |
|---|---|---|
| DE | 202007019340 U1 | 3/2012 |

(Continued)

*Primary Examiner* — Kevin R Steckbauer
(74) *Attorney, Agent, or Firm* — Seed Intellectual Property Law Group LLP (57) ABSTRACT

A wind turbine having a nacelle, with at least one liquid circuit with a coolant, a cooling section for cooling a component of the wind turbine using the coolant, a cooler for cooling the coolant, a piping system for conveying the coolant and an expansion tank for obtaining an operating pressure of the liquid circuit, wherein the expansion tank establishes a pressure in the liquid circuit using static pressure of a liquid column.

11 Claims, 5 Drawing Sheets

(56) References Cited

U.S. PATENT DOCUMENTS

| | | | | |
|---|---|---|---|---|
| 2008/0264601 A1* | 10/2008 | Hansen | ................ | F28D 1/0213 165/47 |
| 2012/0025533 A1* | 2/2012 | Casazza | ............... | H02K 7/1838 290/55 |
| 2013/0277983 A1* | 10/2013 | Hildebrand | .......... | H02K 7/1838 290/55 |
| 2015/0010402 A1 | 1/2015 | Rohden | | |
| 2016/0377352 A1 | 12/2016 | Fuchs et al. | | |

FOREIGN PATENT DOCUMENTS

| | | | | | |
|---|---|---|---|---|---|
| DE | 102014205086 | B3 | 7/2015 | | |
| EP | 2354542 | A1 | 8/2011 | | |
| GB | 371926 | A | * 4/1932 | ............. | H01F 27/12 |
| GB | 371926 | A | 4/1932 | | |
| GB | 2294755 | A | 8/1996 | | |
| JP | S59-148569 | U | 10/1984 | | |
| JP | S63-116054 | A | 5/1988 | | |
| JP | 9-273876 | A | 10/1997 | | |
| JP | 2014-502488 | A | 1/2014 | | |
| WO | 2006069974 | A1 | 7/2006 | | |

* cited by examiner

WIND TURBINE HAVING A LIQUID CIRCUIT AND COMPONENTS THEREFORE

BACKGROUND

Technical Field

The present invention relates to a wind turbine having at least one liquid circuit and one expansion tank and the present invention relates to such a liquid circuit. Moreover, the present invention relates to a method for operating a wind turbine and for operating a liquid circuit of a wind turbine.

Description of the Related Art

For cooling purposes, liquid circuits can be installed in wind turbines and convey a coolant, in particular, water with an additive, through corresponding components which are to be cooled. In that case, the construction is usually such that, in the liquid circuit, the coolant is conveyed, in particular pumped, to at least one component which is to be cooled, and there takes up heat from this component. Such a component can for example be a generator or a converter. The liquid heated in this manner is then conveyed on to a cooler in which the liquid in turn gives off stored heat. The liquid which is re-cooled in this manner can then once again be conveyed to the component which is to be cooled. In principle, such a cooling circuit can also be of more complex configuration and for example cool multiple components, be switchable and/or be used for re-cooling multiple coolers.

Such a cooling circuit has an optimum or preferred pressure or pressure range in which it operates. In cooling circuits for wind turbines, this is frequently at approximately 0.8 bar, that is to say 0.8 bar above ambient pressure.

In order to maintain this pressure in the system, that is to say in the liquid circuit or cooling circuit, so-called membrane-, bladder- or metal bellows-type expansion tanks are used. In particular, expansion tanks with nitrogen-filled gas bladders are known. Such a gas bladder can compensate for minor volume fluctuations in the cooling circuit and thus approximately maintain the desired pressure.

A disadvantage of such expansion tanks is that this gas has a tendency to gradually escape from the bladder. This can be countered by topping up the coolant, the coolant being topped up so as to re-establish the desired pressure. However, this results in the gas volume of this gas bladder being gradually replaced with coolant until this gas bladder no longer functions and it is also no longer possible to equalize the pressure.

A particular problem in this context is that such cooling circuits are generally installed in the nacelle of a wind turbine and therefore maintenance is very onerous. Topping up the coolant can also be very onerous.

Hitherto, no gas bladders or suitable gases have been found which avoid the above-mentioned problem, such that hitherto it also appears difficult to improve the gas bladder.

The German Patent and Trademark Office has searched the following prior art in the priority application relating to the present application: DE 10 2014 205 086 B3, DE 10 2008 017 376 A1, DE 20 2007 019 340 U1 and JP H09-273 876 A.

BRIEF SUMMARY

A cooling circuit of a wind turbine, and thus the wind turbine per se, is to be improved and overcomes the above-mentioned problems with the gas bladder.

Provided is a wind turbine having a cooling circuit and the cooling circuit comprises a coolant, a cooling section for cooling a component of the wind turbine using the coolant, a cooler for cooling the coolant, a piping system for conveying the coolant and an expansion tank for obtaining an operating pressure of the liquid circuit, wherein the expansion tank establishes a pressure in the liquid circuit using static pressure of a liquid column.

Thus, what is proposed is a wind turbine having a liquid circuit which does not require a membrane-, bladder- or metal bellows-type expansion tank. Instead, there is provided an expansion tank which is arranged at a height so as to establish a liquid column, that is to say in particular a water column, which can thus establish a pressure. Preferably, use is made therefore of water which is provided with an additive, in particular antifreeze.

Thus, the expansion tank is raised to an appropriate height above the rest of the liquid cooling circuit, for example approximately 8 m above a reference point at which the pressure is measured. This makes it possible to maintain a pressure of approximately 0.8 bar at the reference point.

The expansion tank is preferably arranged on top of the nacelle and thus a corresponding water column can be established from this expansion tank to the rest of the liquid circuit below.

Use is preferably made of a container which is resistant to UV irradiation, in particular a metal container, which can thus also be arranged outside, where it is exposed to constant UV irradiation.

According to one embodiment, it is proposed that the liquid circuit has a cooler arranged on the outside of the nacelle, and the expansion tank is arranged on this cooler. This makes it in particular possible to simplify the construction and the cooler can be effectively cooled by the wind in the region above the nacelle, and at the same time can accommodate the expansion tank. Thus, it is simple for the expansion tank to be arranged at a high point, in particular the highest point of the liquid circuit. This can also particularly effectively prevent the formation of significant air inclusions in the cooler, since these can easily escape upwards into the expansion tank.

One configuration proposes that the expansion tank has an expansion valve. Such an expansion valve allows pressure to escape outwards if overpressure prevails in the expansion tank, and allows pressure to be admitted into the expansion tank from outside if a corresponding underpressure prevails in the expansion tank. This means in particular that, in the case of overpressure, air can escape from the expansion tank, and, in the case of underpressure, air can flow into the expansion tank. Therefore, this expansion valve is preferably at an upper position of the expansion tank such that only air which has collected at the top escapes, and not the coolant.

Preferably, the overpressure at which pressure escapes outwards can be set as a predefined overpressure. Thus, the pressure escapes through the expansion valve when it has reached or exceeds this predefined overpressure. Additionally or alternatively, it is proposed that the underpressure at which pressure is admitted from outside can be set as a predefined underpressure. Accordingly, outside pressure or air is admitted if the pressure in the expansion tank is at this predefined underpressure or is even further below ambient pressure.

In particular, this expansion valve allows the expansion tank to communicate with the surroundings without being fully open to the surroundings. In the case of minor pressure fluctuations in the liquid circuit, and thus in the expansion tank, this liquid circuit remains a closed system and communicates with the surroundings only at the above-mentioned pressures.

According to another embodiment, it is proposed that the expansion tank has and/or is coupled to a sight glass. Such a sight glass, which can in particular be designed as vertical glass tubes or Plexiglas tubes, can display the liquid level in the expansion tank. Thus, the liquid rises and falls to the same extent in the sight glass and in the expansion tank. In particular, to that end both the top and the bottom of the sight glass are connected to the expansion tank.

Preferably, a protective casing is provided, which partially—and in particular almost completely—encases the sight glass, in order that the sight glass is protected from flying particles and/or from the effects of strong winds, but at the same time is visible from the outside such that the fill level can be identified. In the case of an approximately vertical, tubular sight glass, this can for example be enclosed by the protective casing in a U-shape as seen from above, in order that only one side remains visible.

According to one embodiment, it is additionally or alternatively proposed that a fill level sensor is provided. Such a fill level sensor can function similar to the sight glass, but is electrically connected and can thus be analyzed differently. In particular, it is proposed, for the fill level sensor, that it can transmit its data to an analysis device, in particular on or over a SCADA system. It is thus possible to use the fill level sensor for remote maintenance, and the sight glass can be used during an actual site visit. In addition, the sight glass could also be used to verify correct operation of the fill level sensor, if the sight glass and the fill level sensor are used simultaneously, which is proposed in one embodiment.

Preferably, a filling connection for unpressurized filling of the coolant into the liquid circuit is provided, in particular on the expansion tank. This allows simple topping up or changing of coolant, as required. The particular advantage of this is that it is not necessary to provide a pressure connection in the cooling circuit, and accordingly a matching pressurized filling device is not required. In addition, there is less or even no risk, here, of such a filling opening leading to a sealing problem. Such an unpressurized filling connection is arranged at the top, such that, purely by way of this arrangement, the coolant cannot exit there and therefore this filling connection cannot leak and, even if it were to leak, no coolant would come out.

Preferably, the cooling circuit is connected, for cooling, to at least one generator, one electrical converter and/or one electrical rectifier of the wind turbine. The coolant is therefore conveyed, for cooling, through the generator, the converter and/or the rectifier, or is conveyed through a corresponding cooling device close to each of these, in order to cool the generator, the converter and/or the rectifier. This makes it simple to cool these elements.

Also provided is a liquid circuit which is prepared for use in a wind turbine, in particular for use in the nacelle of a wind turbine. It is thus adapted, in terms of construction, to the conditions in particular in the nacelle. In particular, the expansion tank is arranged at a raised position in or on the nacelle, in order to provide, via a corresponding liquid column, a certain pressure in the cooling circuit.

Thus, there is proposed a liquid circuit having at least one feature as described above for the liquid circuit in the context of embodiments of the wind turbine. Also proposed is a method for operating a wind turbine, in accordance with claim 10. In this context, the turbine is operated such that elements of the wind turbine are cooled using the coolant. Preferably, the wind turbine and/or the cooling circuit is designed as explained above with reference to at least one embodiment.

BRIEF DESCRIPTION OF THE SEVERAL VIEWS OF THE DRAWINGS

The invention is explained in more detail below by way of example on the basis of an exemplary embodiment with reference to the accompanying figures.

DETAILED DESCRIPTION

Figure 1:
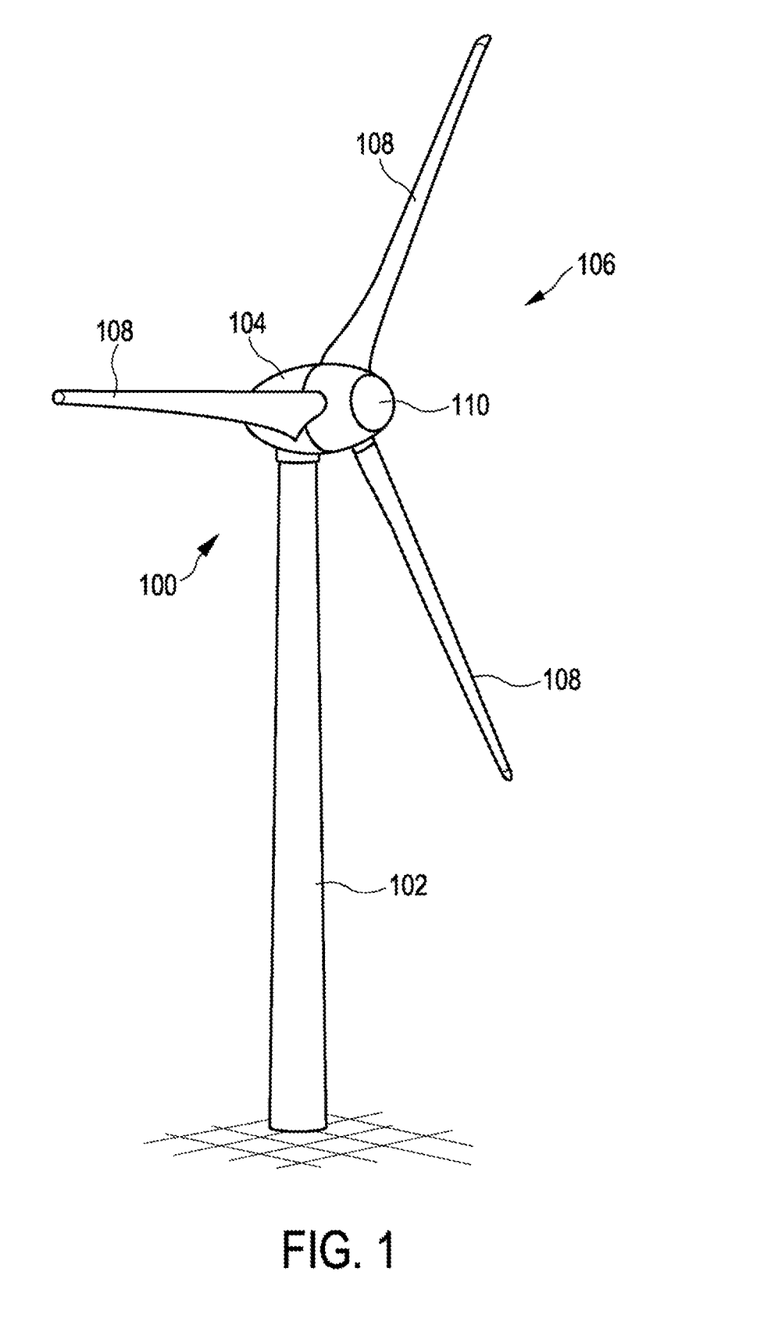
FIG. 1 shows a wind turbine in a perspective view.

FIG. 1 shows a wind turbine 100 with a tower 102 and a nacelle 104. Arranged on the nacelle 104 is a rotor 106 with three rotor blades 108 and a spinner 110. During operation, the rotor 106 is set in rotation by the wind and thereby drives a generator in the nacelle 104.

Figure 2:
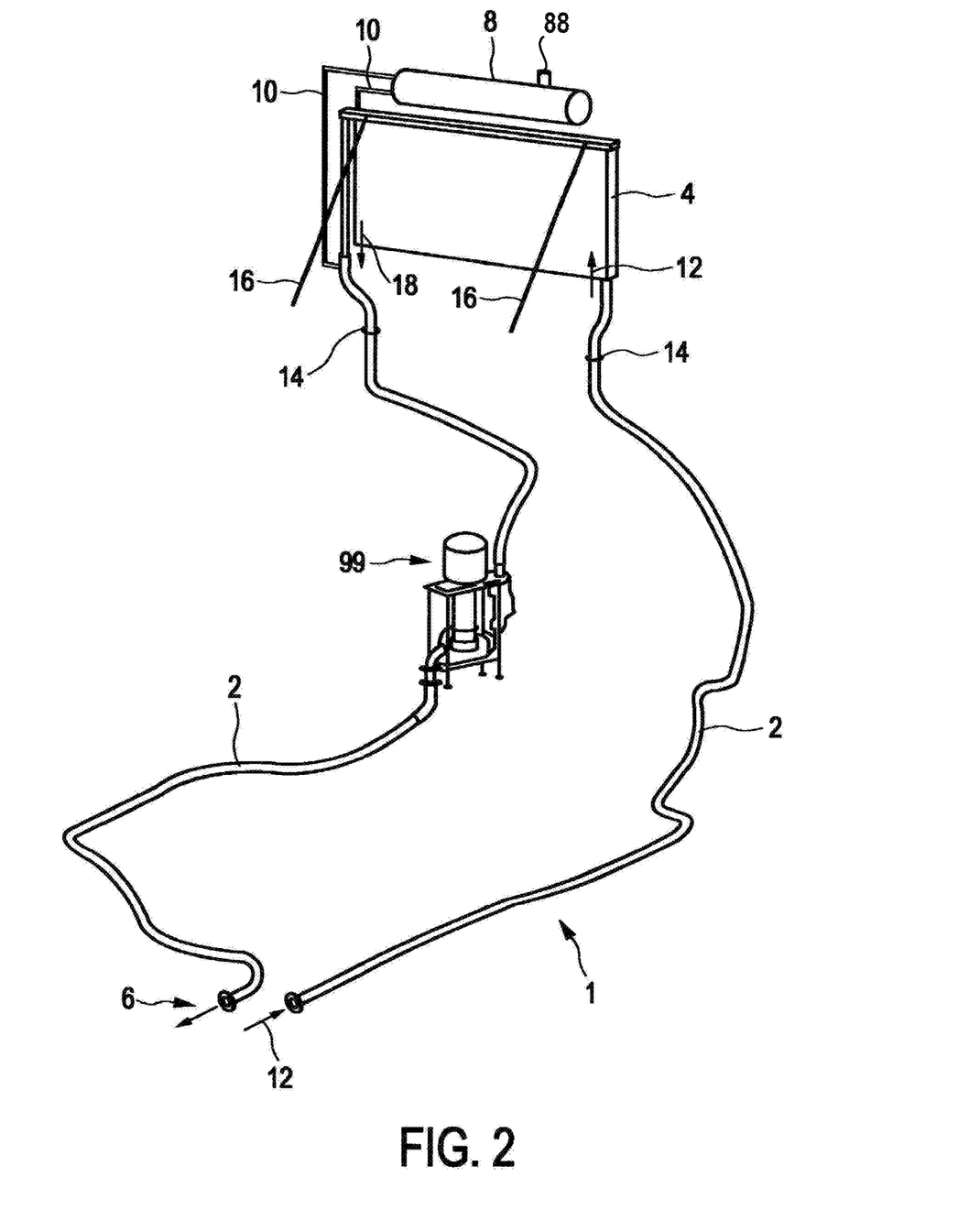
FIG. 2 shows, schematically, a detail of a cooling circuit.

FIG. 2 shows, schematically, a detail of a liquid circuit 1 of a wind turbine. This liquid circuit 1 has a piping system 2 and a cooler 4 and connection points 6 for connecting a cooling section of a component of the wind turbine, such as a generator, a converter or a rectifier. For the sake of simplicity, these components are not shown here in FIG. 2.

In order to obtain the pressure in the liquid circuit 1, there is provided an expansion tank 8 which, here, is arranged above or on the cooler 4. In that context, the expansion tank 8 is connected to the liquid circuit 1 via connection lines 10 which, here, are illustrated only schematically. This can be for example and in part to the cooler 4 or to the piping system 2.

This expansion tank 8 now makes it possible to maintain a comparatively constant pressure in the liquid circuit 1. This is achieved by the expansion tank 8 being arranged higher than the majority of the liquid circuit, in particular higher than the majority of the piping system. This establishes a liquid column, in particular a water column, which can maintain or establish the pressure. Fluctuations in the fill level of the coolant in the liquid circuit can easily be equalized in the expansion tank 8. This occurs in such a manner that these slight fluctuations also become apparent in the expansion tank 8, but this has almost no effect on the total liquid column and thus the pressure hardly changes.

The expansion tank 8 has an expansion valve 88. The expansion valve 88 allows pressure to escape outwards if overpressure prevails in the expansion tank 8, and allows pressure to be admitted into the expansion tank 8 from outside if a corresponding underpressure prevails in the expansion tank 8. This means in particular that, in the case of overpressure, air can escape from the expansion tank 8, and, in the case of underpressure, air can flow into the expansion tank 8. Therefore, the expansion valve 88 is preferably located at an upper position of the expansion tank 8 as is shown such that only air which has collected at the top escapes, and not the coolant.

For explanation purposes only, a membrane-, bladder- or metal bellows-type expansion tank 99 is also illustrated in the cooling circuit 1, but this should be avoided. It is thus proposed to omit this bladder expansion tank 99 and there in particular close the piping system 2 without this bladder expansion tank 99.

Operation is now that heated coolant 12 flows into the piping system 2 of the liquid circuit 1 at the connection point 6. This heated coolant 12 may have been heated in a component which is to be cooled, for example in the generator. The coolant 12 is then conveyed further upwards to the cooler 4, for example by means of a pump (not shown). This cooler 4 can be arranged, together with the expansion tank 8, on the exterior of the nacelle of the wind turbine. To that end, FIG. 2 shows two passage points 14. On the nacelle, the cooler 4 can be attached by means of supports 16 which, here, are shown only schematically.

Thus, the heated coolant 12 then flows into the cooler 4 from below, where it is cooled, and leaves the cooler 4 as cooled coolant 18. The cooled coolant 18 then passes back through one passage point 14, through the piping system to the connection point 6, whence it can once again be used for cooling, i.e., for example in the generator.

If, now, fluctuations appear, e.g., as a consequence of changes in the temperature of the coolant and the associated change in volume thereof, this is transmitted to the expansion tank 8 which can accordingly equalize it. The connection lines 10 can be provided for that purpose. In addition, rising air can also pass through at least one of the connection lines 10 into the expansion tank 8. This can take place from various points in the liquid circuit 1, that is to say for example from the piping system 2 or from the cooler 4.

Figure 3:
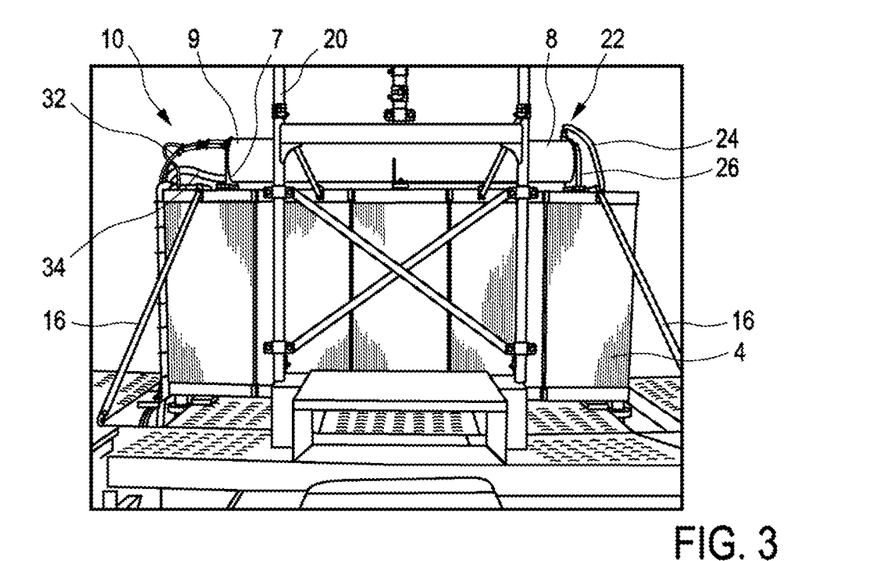
FIG. 3 shows a cooler having an expansion tank.

FIG. 3 shows, in an enlarged and less schematic illustration, the cooler 4 with superposed expansion tank 8. For the sake of simplicity, the same reference signs are used, especially since FIG. 2 is only a schematic illustration while FIGS. 3 to 6 show a specific implementation. Moreover, FIG. 3 also shows the cooler 4 supported with the supports 16.

FIG. 3 additionally shows further accessories, such as the partially illustrated tubular construction 20 which could for example receive an aircraft warning light or an anemometer, which is not dealt with here.

Figure 6:
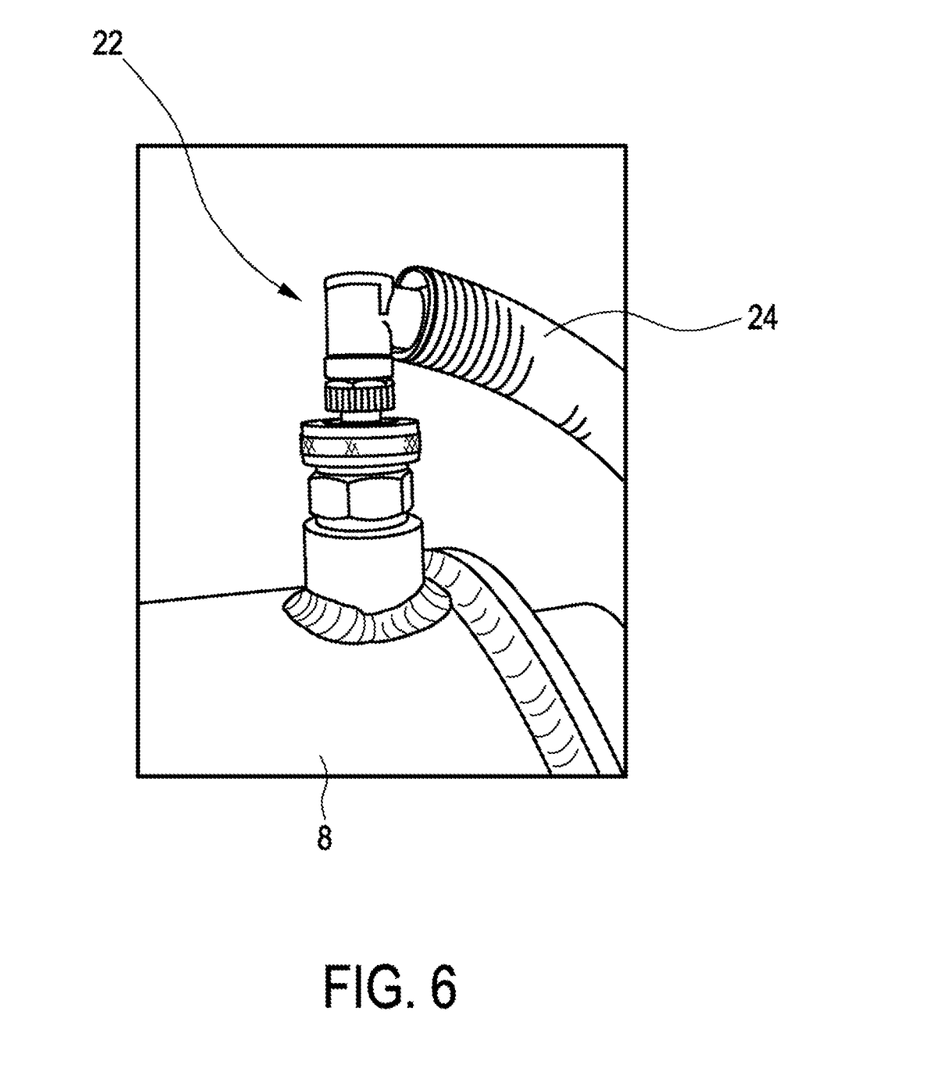

FIG. 3 also shows a connection for a fill level sensor 22 which is shown enlarged in FIG. 6. There, a fill level sensor is inserted from above via this connection 22 and is connected there, it being possibly designed for example as a long cylindrical body, which extends there into the expansion tank 8. It can be controlled and analyzed via a connection line 24 which, here, is encased for protection.

Figure 5:
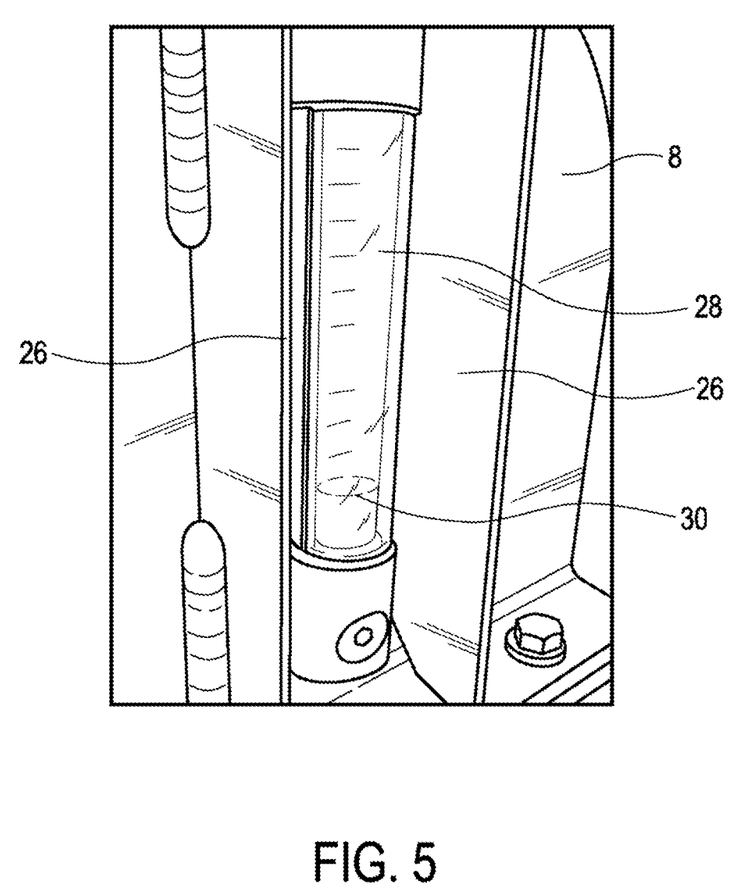

Immediately adjacent to the fill level sensor, the connection 22 of which is illustrated, there is a sight glass in a protective casing 26. While this protective casing 26 is indicated in FIG. 3, it is shown in an enlarged detail in FIG. 5, in a perspective view in relation to FIG. 3, essentially from the right. In that context, FIG. 5 shows that this protective casing 26 protects the sight glass 28 essentially on two sides and from above, which can be seen only in FIG. 3. On a third side, the sight glass is protected by the expansion tank 8. The sight glass 28 shows the current coolant fill level 30.

Figure 4:
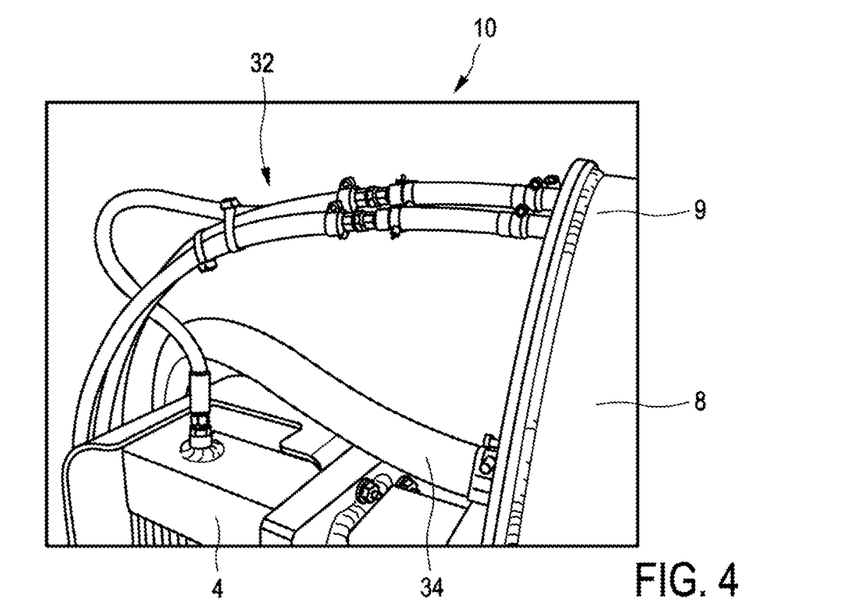
FIGS. 4 to 6 show details of an expansion tank as illustrated in FIG. 3.

Connection lines 10 illustrated schematically in FIG. 2 can also be seen in FIG. 3 and are illustrated enlarged in FIG. 4. In this context, there are multiple bleed lines 32 which discharge into an upper region 9 of the expansion tank 8. One of the bleed lines 32 is directly connected to the cooler 4, such that air from this upper region of the cooler 4 can vent into the expansion tank 8. Other bleed lines 32 run lower, even into the nacelle on the wind turbine, in order to be able to bleed other points there.

Also provided is a feed line 34 via which a lower region 7 of the expansion tank 8 is connected, for exchange of liquid, to the rest of the liquid circuit 1, in particular the piping system 2.

It is thus proposed, for this embodiment and in general, to improve a liquid circuit of a wind turbine by using an expansion tank which in particular replaces a pressure-equalizing device, known hitherto, having a membrane, bladder or metal bellows. By using the static pressure of the liquid column, the proposed expansion tank thus requires no membrane, bladder or metal bellows.

Advantages of this are that such an expansion tank is not subject to wear and permits automatic bleeding of the system; this can also be referred to as an automatic bleed arrangement. The system can be filled without an additional pump. Correct handling of this system, in particular carrying out or executing a fill level check is very simple and can be carried out without aids because in particular a sight glass is proposed for that purpose. Also, the availability of the liquid circuit and thus of the wind turbine as a whole can be increased because this cooling system can be checked at a glance and faults can be identified more quickly. In particular, known membrane-, bladder- or metal bellows-type expansion tanks often provide no indication of when their operation has already deteriorated or possibly even ceased entirely.

Thus, such membrane-, bladder- or metal bellows-type expansion tanks were a consumable part which was difficult to handle and which required correct setting of a pre-pressure, at the risk of disrupting the operation of the entire installation. In particular, such a pre-pressure had to be checked on an annual basis, which was time-intensive. Automatic bleeding was also less possible or at least associated with risk because it was thereby possible for the system to drain if these do not close properly, which has been known to happen. In the prior system, a filling pump was absolutely necessary for filling because the system is pressurized. A similar problem arose when it was necessary to replace a sensor of the fill level monitoring system, because this could be carried out only by partially emptying and of course subsequently refilling the system. It is thus possible to increase availability and substantially simplify the handling of the system, such that it might be possible to reduce the level of qualification required for personnel.

In addition, it has also been proposed to place a fill level monitoring arrangement at one location at which it is possible to replace a sensor without partially emptying the system. The sight glass is also placed at an easily accessible location but at the same time is protected from external mechanical influences.

It is also proposed to dimension the tank so as to avoid opening of a pressure cap, that is to say in particular opening of an expansion valve. It is thus proposed to dimension the expansion tank such that foreseeable fluctuations, which in particular manifest themselves in the form of fluctuations of the fill level in the tank, relative to the quantity of air provided in the tank, bring about an accordingly low variation in the pressure of this air volume.

The invention claimed is:

1. A wind turbine comprising:
a nacelle, and
a liquid circuit including:
a coolant,
a cooling section for cooling a component of the wind turbine using the coolant,
a cooler for cooling the coolant,
a piping system for conveying the coolant, and an expansion tank arranged on top of the nacelle, wherein the expansion tank is configured to obtain an operating pressure of the liquid circuit, wherein the expansion tank establishes a pressure in the liquid circuit using static pressure of a liquid column, wherein the expansion tank has an expansion valve on the expansion tank, wherein the expansion valve is configured to automatically open and close such that:
 above a predetermined overpressure, the expansion valve vents pressure outward, and
 below a predetermined underpressure, the expansion valve allows pressure in from outside, wherein the cooler is arranged on an outside surface of the nacelle, and wherein the expansion tank is arranged on the cooler.

2. The wind turbine according to claim 1, wherein the expansion tank includes or is fluidically coupled to a sight glass configured to display a level of the liquid in the expansion tank.

3. The wind turbine according to claim 1, further comprising a fill level sensor for detecting a fill level of the coolant in the expansion tank.

4. The wind turbine according to claim 1, wherein the liquid circuit has a filling connection for unpressurized filling of the coolant.

5. The wind turbine according to claim 1, wherein the component of the wind turbine is at least one of a generator, a converter or a rectifier of the wind turbine.

6. The wind turbine according to claim 2, further comprising a protective casing for partially encasing the sight glass.

7. The wind turbine according to claim 4, wherein the expansion tank includes the filling connection.

8. The wind turbine according to claim 1, wherein the expansion valve is configured to vent air.

9. A liquid circuit for use in a wind turbine having a nacelle, the liquid circuit comprising:
 a coolant,
 a cooling section for cooling a component of the wind turbine using the coolant,
 a cooler for cooling the coolant,
 a piping system for conveying the coolant, and
 an expansion tank for obtaining an operating pressure of the liquid circuit, wherein the expansion tank establishes a pressure in the liquid circuit using static pressure of a liquid column, wherein the expansion tank has an expansion valve on the expansion tank, wherein the expansion tank is configured to automatically open and close such that:
 above a predetermined overpressure, the expansion valve vents pressure outward, and
 below a predetermined underpressure, the expansion valve allows pressure in from outside, wherein the cooler is arranged on an outside surface of and at the top of the nacelle of the wind turbine, and wherein the expansion tank is arranged on the cooler.

10. A method for cooling a component of a wind turbine having a nacelle, the method comprising:
 providing coolant through a cooling section of a liquid circuit,
 cooling the component of the wind turbine using the coolant,
 providing the coolant to a cooler of the liquid circuit, wherein the cooler is arranged on an outside surface of the nacelle of the wind turbine,
 using the cooler, cooling the coolant, and
 using an expansion tank to obtain an operating pressure of the liquid circuit, the expansion tank arranged on the cooler and on top of the nacelle, wherein using the expansion tank establishes a pressure in the liquid circuit using static pressure of a liquid column,
 wherein using the expansion tank comprises using an expansion valve on the expansion tank, wherein the expansion valve automatically opens and closes such that:
  above a predetermined overpressure, the expansion valve vents pressure outward, and
  below a predetermined underpressure, the expansion valve allows pressure in from outside.

11. The method according to claim 10, wherein the component of the wind turbine that is cooled is at least one of a generator, a converter or a rectifier and is located on the nacelle.

* * * * *